(12) United States Patent
Cavalcanti et al.

(10) Patent No.: US 8,169,941 B2
(45) Date of Patent: May 1, 2012

(54) QOS SCHEDULING METHODS FOR WLANS WITH HETEROGENOUS APPLICATIONS

(75) Inventors: Dave Cavalcanti, Ossining, NY (US); Ruediger Schmitt, Maplewood, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 397 days.

(21) Appl. No.: 12/519,767

(22) PCT Filed: Dec. 4, 2007

(86) PCT No.: PCT/IB2007/054921
§ 371 (c)(1),
(2), (4) Date: Jun. 18, 2009

(87) PCT Pub. No.: WO2008/075239
PCT Pub. Date: Jun. 26, 2008

(65) Prior Publication Data
US 2010/0039973 A1 Feb. 18, 2010

Related U.S. Application Data

(60) Provisional application No. 60/870,429, filed on Dec. 18, 2006.

(51) Int. Cl.
*G08C 17/00* (2006.01)

(52) U.S. Cl. ............ 370/311; 370/328; 370/230
(58) Field of Classification Search ............ 370/310, 370/310.2, 311, 328, 230, 318
See application file for complete search history.

(56) References Cited

U.S. PATENT DOCUMENTS

| | | | |
|---|---|---|---|
| 2004/0042435 A1 | 3/2004 | Soomro et al. | |
| 2004/0047351 A1 | 3/2004 | Del Prado Pavon et al. | |
| 2004/0190467 A1 | 9/2004 | Liu et al. | |
| 2005/0003794 A1 | 1/2005 | Liu | |
| 2005/0025081 A1* | 2/2005 | Wakamatsu | 370/311 |
| 2005/0036466 A1 | 2/2005 | Malik et al. | |
| 2005/0094609 A1 | 5/2005 | Tandai et al. | |
| 2006/0025169 A1 | 2/2006 | Maciocco et al. | |
| 2006/0171341 A1* | 8/2006 | Wang et al. | 370/311 |
| 2006/0171362 A1* | 8/2006 | Garg et al. | 370/338 |
| 2006/0268891 A1* | 11/2006 | Heidari-Bateni et al. | 370/395.4 |
| 2006/0285526 A1* | 12/2006 | Jang et al. | 370/338 |
| 2007/0014269 A1* | 1/2007 | Sherman et al. | 370/338 |
| 2008/0095091 A1* | 4/2008 | Surineni et al. | 370/311 |
| 2009/0122768 A1* | 5/2009 | Nakashima et al. | 370/338 |
| 2009/0252135 A1* | 10/2009 | Benveniste | 370/338 |
| 2010/0315979 A1* | 12/2010 | Surineni et al. | 370/310 |

* cited by examiner

*Primary Examiner* — Andrew Lai
*Assistant Examiner* — Nguyen Ngo

(57) ABSTRACT

A wireless system (100) includes at least one power-save wireless station (PS STA)(102). A method of wireless includes allocating deterministic time intervals (206,207) to the PS-STAs.

20 Claims, 5 Drawing Sheets

QOS SCHEDULING METHODS FOR WLANS WITH HETEROGENOUS APPLICATIONS

CROSS REFERENCE TO RELATED APPLICATIONS

This application claims the benefit of U.S. provisional application Ser. No. 60/870,429 filed Dec. 18, 2006, which is incorporated herein by reference.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

An ever-present challenge in standards such as IEEE 802.11 and its progeny is to provide Quality of Service (QoS) guarantees to real-time and critical applications, such as voice and medical applications, while minimizing the power consumed by certain mobile wireless stations (STAs). Recently, the IEEE 802.11e amendment to the IEEE 802.11 standard has been approved. IEEE 802.11e defines the Hybrid Coordination Function (HCF) Controlled Channel Access (HCCA) operation mode to support parameterized QoS through a Hybrid Coordinator (HC), which is an access point (AP) that controls the access to the medium and grants transmission opportunities (TXOPs) to the STAs according to a centralized transmission schedule.

In known systems, APs control access to the medium by, among other tasks, scheduling access to the medium. In such known systems, the AP schedules wireless stations (STAs) with the lowest delay requirements (earlier deadlines) first. In this way, the reliability of STAs with low delay requirements is improved by scheduling these STAs with greater priority in the data transfer period. By contrast, STAs with larger delay requirements (later deadlines) may not be able to access the medium and, as such, may receive a lower quality of service compared to STAs with lower delay requirements. By way of example, a voice application, which has a low delay requirement, typically less than approximately 20 ms, is granted priority over a medical STA that normally can support comparatively higher delays, which can be as great as approximately 250 ms.

Moreover, known scheduling algorithms fail to account for reliability requirements (e.g., packet loss requirements) and power consumption requirements of STAs. As will be appreciated, in certain applications, reliability of service is exceedingly important; while in other applications it is useful, if not essential for STAs to conserve electrical power to ensure longevity.

There is a need, therefore, for a method and system that overcomes at least the shortcomings described above.

In accordance with an illustrative embodiment, a wireless system includes a plurality of wireless stations (STAs) and at least one of the STAs is a Power-Save (PS) STA. The system also includes another wireless STA adapted to provide access to a medium of a wireless network. The PS STA is provided deterministic access to the medium before other STAs of the plurality of STAs.

In accordance with yet another illustrative embodiment, a method of wireless communication includes scheduling a power save transmission opportunity (PS-TXOP) in a power save (PS) period after a termination of a beacon transmission and before other transmission opportunities (TXOPs).

The invention is best understood from the following detailed description when read with the accompanying drawing figures. It is emphasized that the various features are not necessarily drawn to scale. In fact, the dimensions may be arbitrarily increased or decreased for clarity of discussion. Wherever practical, like reference numerals refer to like elements in the drawing figures.

Figure 1:
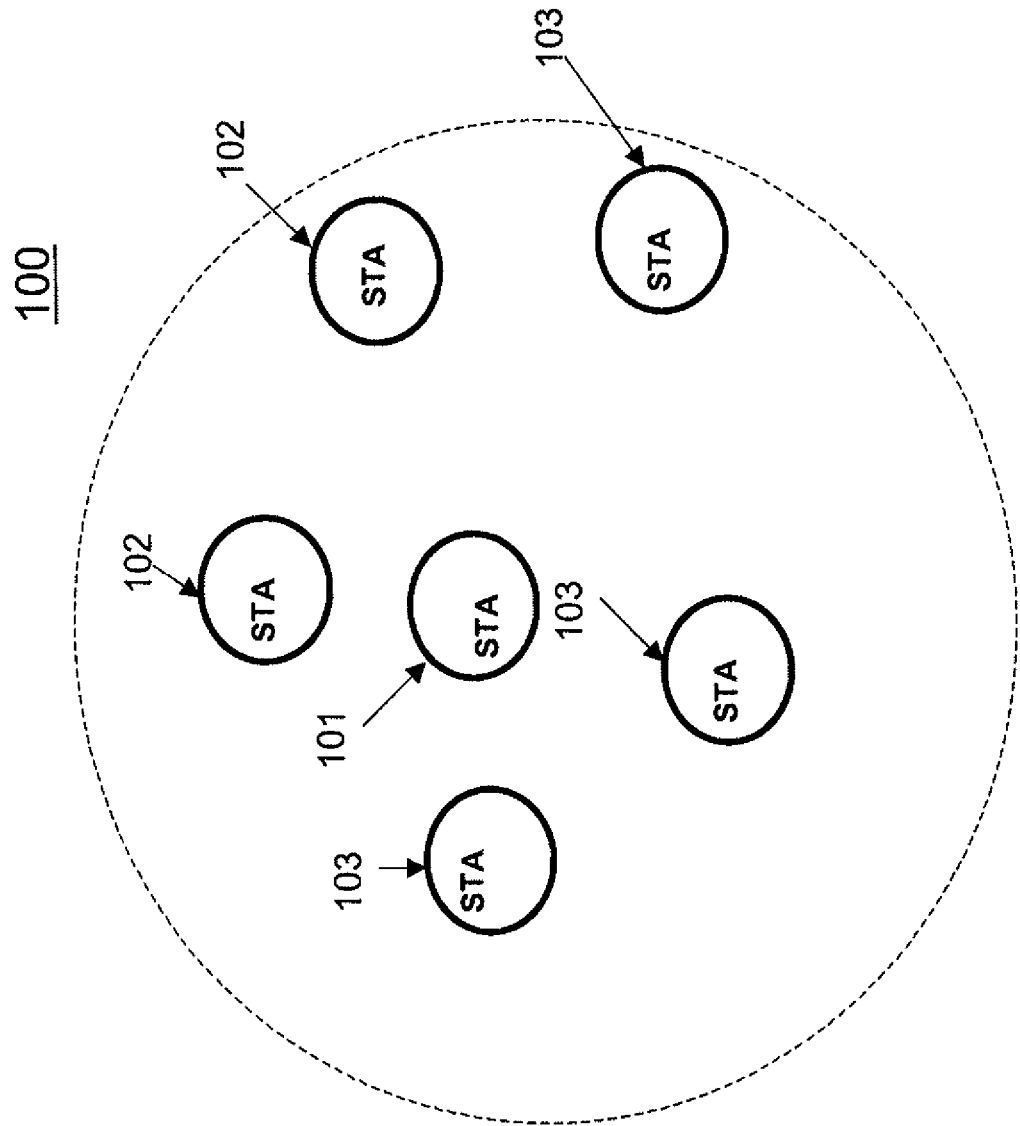
FIG. 1 is a simplified schematic diagram of a wireless communication system in accordance with a representative embodiment.

As used herein, the terms 'a' and 'an' mean one or more; and the term 'plurality' means two or more.

As used herein, the term 'deterministic' means having a time evolution that can be predicted with substantial precision. For example, a deterministic time interval is a time interval that has a beginning and an end that can be predicted with substantial precision.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the representative embodiments. Nonetheless, such devices, methods, systems and protocols that are within the purview of one of ordinary skill in the art may be used in accordance with the representative embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under the ECMA 368 standard, IEEE 802.16, IEEE 802.11, or IEEE 802.15. The disclosures of the referenced specifications are specifically incorporated herein by reference in their entirety.

Moreover, the network may be a cellular network; a wireless local area network (WLAN); a wireless personal area network (WPAN); a wireless body area network (WBAN) or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

FIG. 1 is a simplified schematic view of a wireless system 100 in accordance with an illustrative embodiment. The wireless system 100 may comprise a centralized network and include an access point (AP) 101, which is also referred to as a base station (BS), or as an HC. The wireless system 100 further comprises a plurality of wireless stations, which also may be referred to as wireless stations (STAs) or Customer Premise Equipment (CPE).

While the description that follows relates primarily to a centralized network with AP 101, distributed networks are clearly contemplated by the present teachings. As will be readily appreciated by one of ordinary skill in the art, in a distributed system, the AP 101 is not provided. Rather, another STA(s) controls access to the medium, and fulfills the functionality of the AP 101.

Illustratively, the wireless system 100 may comprise one of the types of networks noted previously. Moreover, the STAs may be computers, mobile telephones, personal digital assistants (PDA), wireless sensors, or similar device that typically operates in such networks. In a specific embodiment, at least one of the STAs is stationary. It is also contemplated that the STAs may be adapted to function in restricted frequency channels of a frequency band that requires protection of incumbent users or in frequency channels of an unlicensed frequency band. Often, in the interest of simplicity, restricted frequency channels, restricted channels and frequency channels in unlicensed frequency bands may be referred to herein as simply 'channels.'

The system 100 includes low-power (also referred to as power-save) STAs (PS STAs) 102 and real time multi-media STAs (RT STAs) 103. In a representative embodiment, the STAs 102 are adapted to enter a power-save (PS) mode, during which the STAs 102 are essentially 'asleep', which is a common term of art meaning the STA is in a mode of not receiving or transmitting data (and thereby conserving power).

Generally, PS STAs 102 could be any wireless device that has constrained power resources or that aims to minimize the consumed power to access the network. During PS mode the STAs 102 may be performing certain functions that normally do not require significant power resources. As such STAs and PS mode are known to one skilled in the art, details are omitted to avoid obscuring the description of the illustrative embodiments.

STAs 103 by contrast are not necessarily adapted to enter PS mode. Rather, these devices are adapted to transmit/receive voice/audio data, or video data, or both. Notably, STAs 103 may be other than RT STAs. Generally, STAs 103 have comparatively low-delay requirements, or comparatively low reliability requirements, or both.

It is noted that only a few STAs 102, 103 are shown; this is merely for simplicity of discussion. Clearly, many other STAs may be used. Finally, it is noted that the STAs 102, 103 are not necessarily the same. In fact, a plethora of different types of STAs adapted to function under the chosen protocol may be used within the network(s) of the system 100.

In one representative embodiment, the wireless system 100 is of a type that requires support for polled access for two different applications that need QoS guarantees, such as a medical telemetry and monitoring application and Voice over Internet Protocol (VoIP). Often, medical telemetry and monitoring STAs are PS STAs that also require comparatively high reliability. Notably, this may be a common scenario, as VoIP over WLANs are becoming prevalent. For example, the system 100 is contemplated for use in a hospital that has to support both medical devices and VoIP, in addition to IT traffic, over the same WLAN. In this scenario polled access is expected to play a useful role to guarantee the QoS for the applications, but the performance of the polled access mechanism depends on the scheduling method selected. It is emphasized that the examples provided are merely intended to illustrate one contemplated implementation of the present teachings. The present teachings are contemplated for use in a variety of wireless applications in which STAs of the system have disparate power consumption, delay and QoS requirements.

Figure 2:
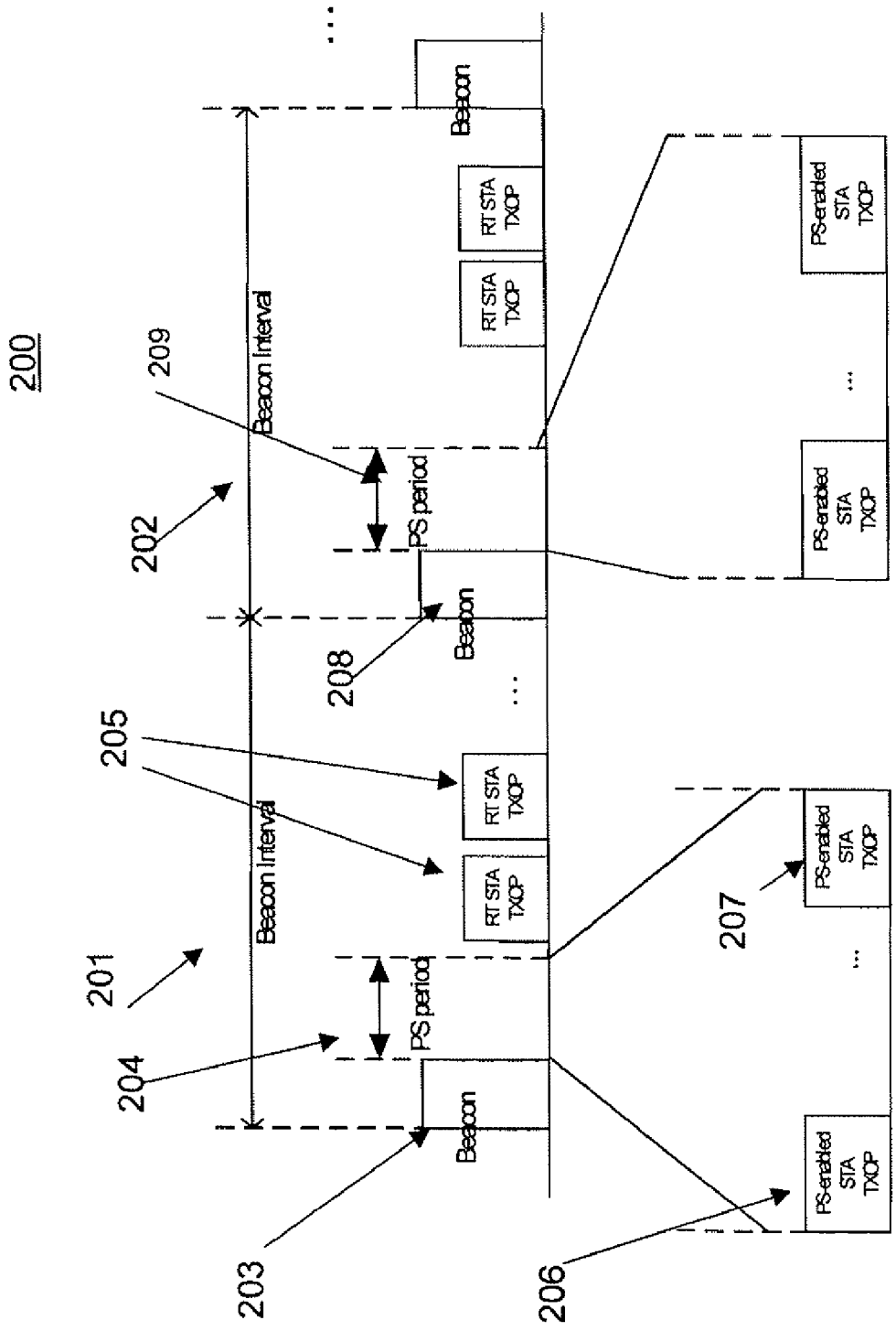
FIG. 2 is a timing diagram of data communication in accordance with a representative embodiment.

FIG. 2 is a conceptual view of a timing diagram 200 in accordance with a representative embodiment. The diagram includes a first beacon interval (BI) 201 and a second BI 202, and each beacon interval may comprise a superframe or a portion of a superframe.

A first beacon transmission period (BT) 203 is initiated at the beginning of the first BI 201. As will be described in greater detail herein, in addition to other activity, an AP (e.g., STA 101) in a centralized network or other STA in a distributed network performs certain functions relating to polling of STAs, or scheduling communications between PS STAs 102 and RT STAs 103, or both, during the ensuing data transfer in the first BI 201, or in later BIs, or both.

After the termination of the first BT 203, a PS period 204 begins. The PS period 204 includes PS transmission opportunities (PS-TXOPs) 206, 207. While only two such opportunities are shown, the present teachings contemplate a PS-TXOP for each PS STA scheduled for the PS period 204. The PS-TXOPs 206, 207 allow respective PS-STAs unfettered access to the medium before access is granted to other STAs (e.g., RT STAs 103) in the system 100. During PS-TXOPs 206, 207, the AP 101 (or other STA in a distributed network) and the respective PS-STAs (e.g., PS-STA 102) may exchange data or the PS-STAs may exchange data with other STAs in the network.

Beneficially, the allocation of PS-TXOPs 206, 207 to respective PS-STAs 102 after BT 201 reduces the possibility that the communication start time defined for a PS STA 102 is delayed due to other transmissions. Notably, the AP 101 has higher priority of access to the medium. Therefore, the AP 101 can ensure that no other transmissions take place in the network after the BT 201 and before the PS-TXOPs 206,207.

As will be described more fully in connection with FIG. 3, the PS STAs 102 are polled before any other STA (e.g., an RT STA) can access the channel after the beacon transmission. Accordingly, the AP 101 grants the PS-TXOPs 206, 207 at deterministic time intervals, such that a PS-STA may enter active mode ("wake up") at deterministic time instants right before the expected polling time, use the granted PS-TXOP, and then go back into "sleep" (PS) mode. This operation yields the minimal power consumption for PS-STAs. Usefully, only the AP 101 (or other STAs that perform the scheduling) can access the medium after BTs 203, 208. This reduces the chance of delaying the PS-TXOPs for PS-STAs, thereby enabling the synchronization between the medium access schedule and PS mode.

In a representative embodiment, the PS-STA 102 assigned to PS-TXOP 206 is a medical telemetry or monitoring device adapted to transmit patient data to the AP 101, and after completing this transmission, enters a sleep-mode to conserve power. As will be appreciated, the data provided by the PS-STA 102 may be vital to patient care and thus is important. As such, the reliability of the transmission is important. Moreover, the power conservation requirement of the PS-STA ensures that monitoring can be completed over a long period of time without concern of interruption due to power failure. By virtue of the present scheduling method, unfettered access provides comparatively high reliability (QoS) and allows the PS-STA 102 to remain idle until the next PS-TXOP scheduled at a deterministic time for the particular PS-STA 102, thus allowing for power conservation.

After completion of the scheduled PS-TXOPs 206, 207, the PS Period 204 terminates. After termination of the PS Period 204, the remaining time in the first BI 201 includes other TXOPs, which are reserved for non-PS STAs. In a representative embodiment, RT TXOPs 205 are scheduled, with an RT TXOP 205 allocated to a respective RT STA 103. As noted previously, more or fewer RT TXOPs 205 may be provided than the number shown. Moreover, other types of STAs may be allocated TXOPs (not shown) in the remaining portion of the BI 201 after termination of the PS Period 204. The allocation and media access provided to the RT STAs and other STAs may be in accordance with a known protocol such as the protocols noted previously.

After the termination of the first BI 201, the second BI 202 begins with the commencement of the second BT 208. After the second BT 208, a second PS Period 209 commences and the exchange of data continues in a manner described in connection with the first BI 201. In a representative embodiment, PS-TXOPs are granted to the same PS STAs at deterministic start times in subsequent (e.g., consecutive) PS periods. As such a PS-TXOP may be provided to one PS-STA in PS Period 204 and at a deterministic start time in PS-TXOP in PS Period 209, and so forth in subsequent BIs. Alternatively, or additionally, other PS STAs 102 that were not granted PS-TXOPs in PS Period 204 may be granted PS-TXOPs in PS Period 209. Also, certain PS STAs 102 that were granted PS-TXOPs in PS Period 204 may not be granted PS-TXOPs in PS Period 209.

Figure 3:
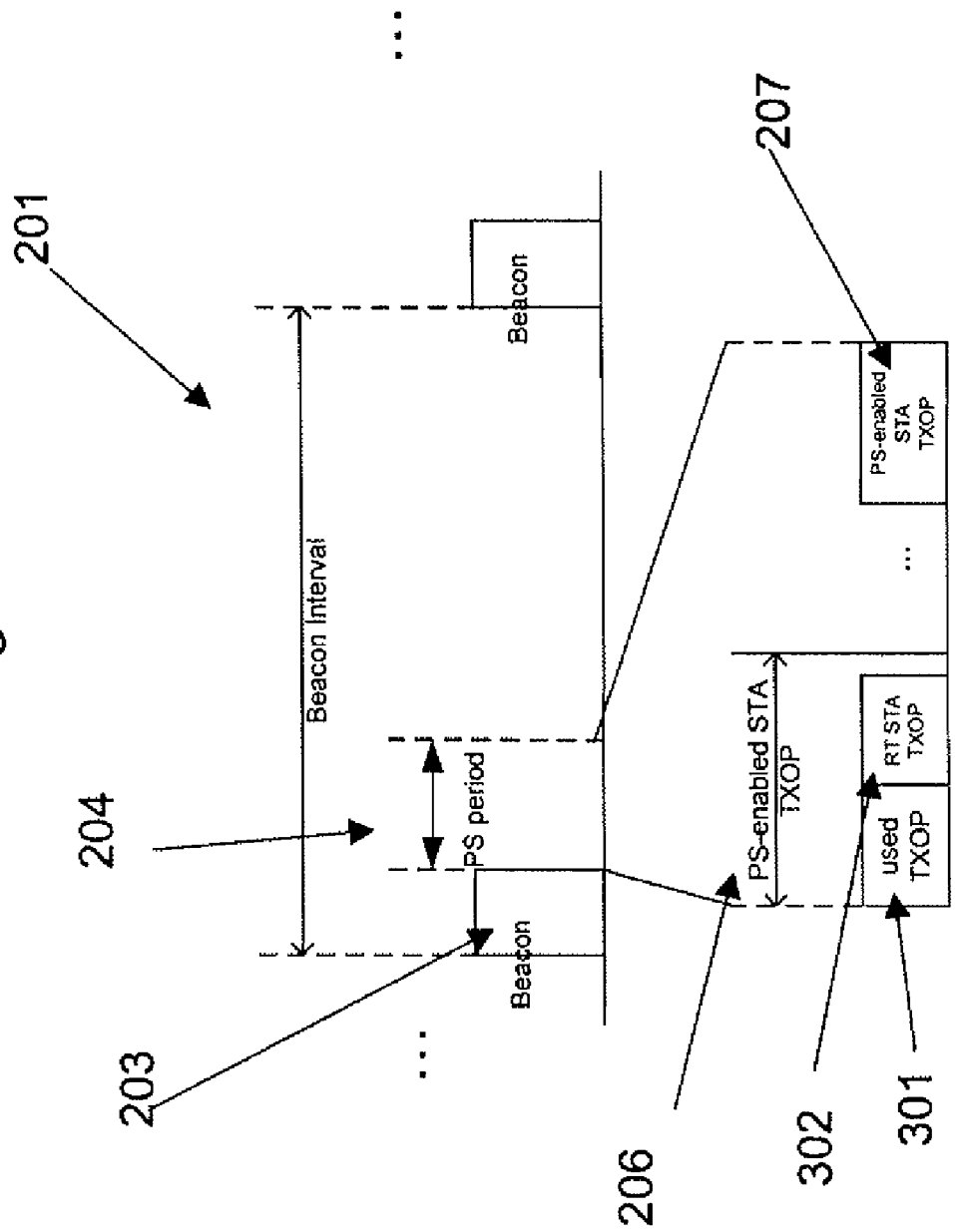
FIG. 3 is a timing diagram of data communication in accordance with a representative embodiment.

FIG. 3 is a conceptual timing diagram 300 in accordance with another representative embodiment. The timing diagram 300 shares many features in common with the embodiments described in connection with FIGS. 1 and 2. Duplicative details are omitted to avoid obscuring the features of the present embodiment.

The PS Period 204 comprises PS TXOPs 206, 207 as shown. In certain cases, a PS STA 102 may complete its access to the medium (e.g., complete its transmission) prior to termination of a PS-TXOP. After successfully receiving data from the PS STA 102, the AP 101 (or other STA controlling access to the medium in a distributed network) transmits an acknowledgement (ACK) to the PS STA 102. Alternatively or additionally, the AP 101 may transmit data to the PS STA 102. Upon successfully receiving the data, the PS STA 102 transmits an ACK to the AP 101. At this point, the PS STA 102 may enter sleep mode. However, there may be time remaining in the PS-TXOP that was not used by the PS STA 102. In accordance with a representative embodiment, at this point the AP 101 (or other STA having control over the medium) may grant access to the medium to an STA 103.

In the timing diagram 300, the PS TXOP 206 includes a used TXOP 301 and an RT TXOP 302. The used TXOP 301 represents a PS TXOP that is completed before the termination of allocated time for the PS TXOP 206. After transmitting or receiving the ACK, the AP grants the RT TXOP 302 to an STA 103. This STA 103 then accesses the medium and terminates access by the end of the allocated time of the RT TXOP 302. Notably, while only one RT TXOP 302 is shown, there may be more RT TXOPs allocated to other STAs 103 within the PS TXOP 206, if such allocation is within the bounds of the time available. After completion of the PS TXOP 206, the medium access continues as described previously.

In another representative embodiment, the PS STA 102 may receive data from the AP 101 (or other STA controlling the access to the medium) within the PS-TXOP 206. In this case, after the transmission of the last data frame the AP 102 (or other STA controlling access to the medium) indicate to the PS STA 102, using know protocols and methods, that there is no more data to be sent. After receiving the data, the PS STA 102 responds to the last transmission with an ACK and if there is remaining time in the PS-TXOP 26, the AP 101 (or other STA controlling the access to the medium) may allocate the remaining time in the PS-TXOP 206 to other non-PS STA, as described previously.

As will be appreciated, the present teachings allow one or more STA 103 to access the medium and thus make use of medium access time that would otherwise go unused. As will be appreciated, this improves the utilization of the medium. Ultimately, by allocating more fully medium access time to STAs 103, the overall reliability and QoS of the system 100 are improved.

Figure 4:
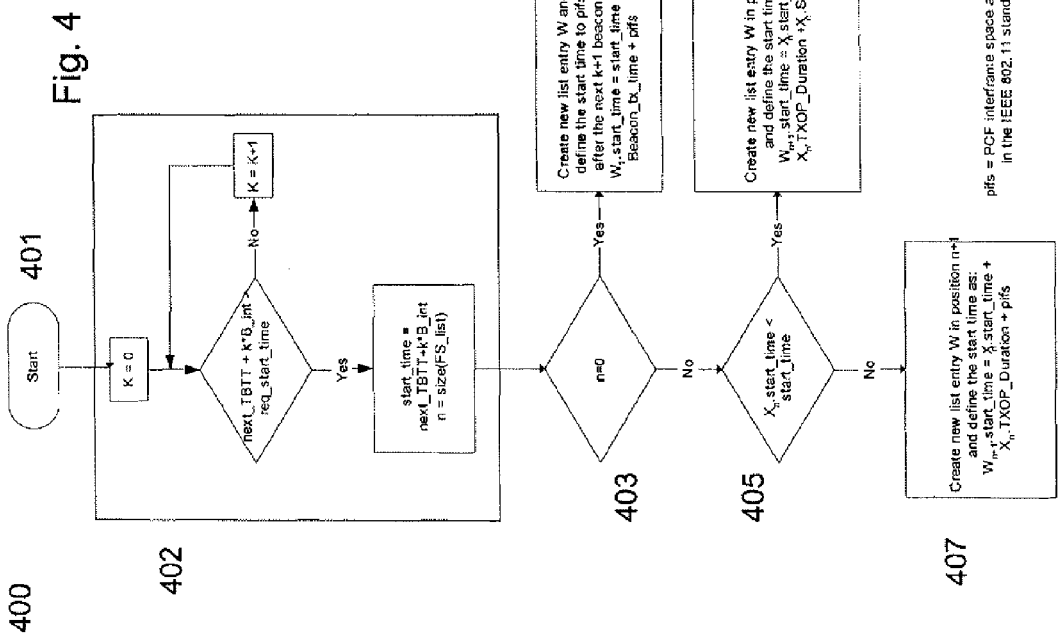
FIG. 4 is a flow chart of a method of wireless communication in accordance with a representative embodiment.

Moreover, and as explained more fully in connection with FIG. 4, the scheduling of STAs 103 in the remaining time of a PS-TXOP according to the present teachings will not impact the start-time of another PS TXOP and thus will not adversely impact the QoS of PS STAs 102, and other STAs 103.

In addition to other benefits, the opportunistic scheduling of representative embodiments can provide hard and soft delay guarantees for distinct STAs that are classified based on their power, reliability and delay requirements. As is known, a hard delay guarantee ensures that the delay bound defined for every STA admitted to a network will be satisfied, irrespective of the traffic load in the network. On the other hand, a scheduling algorithm that provides "soft" guarantees tries to satisfy the delay bound requirements, but the delay can increase above the delay bound under overloaded traffic conditions. In representative embodiments, the PS STAs 102 that are scheduled in PS periods after beacons can receive hard delay guarantees, while STAs 103 that are opportunistically scheduled into TXOPs within the PS-TXOPs can receive soft delay guarantees.

FIG. 4 is a flow chart of a method 400 of wireless communication. Notably, certain sub-steps are shown in FIG. 4. The details of these sub-steps are not described in detail to avoid obscuring the description of the present illustrative embodiments.

As noted, the AP 101 (or other STA if the network is a distributed network) controls access to the medium. According to the governing protocol, the AP 101 receives an admission request from an STA. Based on information from the admission request packet data, the requesting STA may be classified as PS STA 102, RT STA 103 or other type of non-PS STA. For example, in a representative embodiment, the network functions under the 802.11e MAC protocol. In such an embodiment, the three bits of a User Priority (UP) field in a Traffic Stream (TS) Info field contained in the TSPEC is set by STA in the admission request frame (ADDTS request) to the AP 101.

The AP 101 may use this information to classify STAs as PS STAs 103 or RT STAs (e.g., STAs 103). Illustratively, the wireless protocol of the system may use the UP field to classify the STAs as PS-STAs 102 or STAs 103. For example, a specific combination of the three bits could be used to indicate the STA is PS-enabled, and all other combinations could be classified as RT STAs.

Once the request is received, the AP 101 executes an admission control procedure to decide whether to admit this new STA. In a representative embodiment, if the STA is admitted, the AP 101 creates one entry for the STA in one of the following two lists:

A fixed scheduling list (FS_list) with one element per PS STAs admitted by the AP; and A list with RT STAs (RT_list), i.e., STAs admitted to use the polling based access but that are not PS STAs.

In another representative embodiment, each element X of the FS_list contains at least the following attributes:

X.Address=MAC address of the STA;
X.start_time=The expected start time of the next TXOP for this STA;
X.SI=the Service Interval between consecutive service periods;
X.TXOP_Duration=The amount of time to granted to the STA in the next service period.

The FS_list could be ordered according to the start_time attribute and the start times of two consecutive elements in the FS_list, $X_n$ and $X_{n+1}$, should satisfy the following condition:

$$X_{n+1}.\text{start\_time} > X_n.\text{start\_time} + X_n.TXOP\_\text{Duration}. \quad (1)$$

This condition avoids overlapping of the TXOP granted to PS STAs, thereby ensuring that a PS STA 102 will not be awake, while waiting for the end of a ongoing TXOP before it can be served.

In another embodiment, the AP 101 assigns the service interval (SI) for all PS STAs 102 as a multiple of the Beacon Interval (B_interval) given by:

$$X_n.SI = \beta * B\_\text{interval}, \text{ for } \forall n, \text{ where } \beta = 1, 2, \ldots \quad (2)$$

In an embodiment, the integer constant $\beta$ could be defined as:

$$\beta = \left\lceil \frac{\text{Req\_SI}}{\text{B\_interval}} \right\rceil, \quad (3)$$

where Req_SI denotes the SI requested by the PS STAs 102 in the TSPEC and $\lceil x \rceil$ denotes the largest integer smaller than x. In order to efficiently utilize the PS mode to save power, the STA must generate a deterministic traffic pattern and most likely it will have a constant SI, otherwise it would be impossible to achieve a synchronization with the scheduler.

A next beacon transmission (e.g., in BT 208) by the AP 101 at any time instant is given by next_TBTT and req_start_time (A) is the expected start time indicated by a given STA to the AP in the admission request frame (ADDTS Request). The illustrative method described in connection with FIG. 4 is useful to insert the PS STA into the FS_list. The main idea is to grant the first poll in the first available position after the first beacon after the req_start_time.

At step 401 the zeroth order interval begins. At step 402, the AP 101 first determines after which future beacon the STA could be served for the first time based on the requested start time. In particular, the AP 101 determines if the requested start time is greater than the next time target beacon transmission time or if it is greater than the target beacon transmission time of a future beacon. Once the future beacon after which the STA could be served is selected, the AP 101 checks in step 403 the current number of PS STAs in the FS_list. If the FS_list is empty, then, at step 404, the AP 101 inserts the new STA in the first position of the list and sets the actual start time for the PS-TXOP for an interframe space interval (e.g. PIFS in the 802.11 standard) after the transmission of the future beacon frame. At step 405, in case there are other PS STAs in the FS_list, the AP 101 determines whether the new STA should be polled after the next PS-TXOP granted to the last PS STA in the FS_list, or a in service interval thereafter.

Next, in step 406 if the start time of the last STA in the FS_list (Xn.start_time) is earlier than the start time of the BI at which the new STA should be polled the AP 101 inserts the new STA in the end of the FS_list and sets its start time for a service interval after the next PS-TXOP granted to the previously last STA in the FS_list. Otherwise, the AP 101 in step 407 inserts the new STA in the last position of the FS_list and is polled after the next poll for the previously last STA in the FS_list.

The method of FIG. 4 is useful to insert new PS STAs in the FS_list and to set the time of their first PS-TXOP, which considering all other STAs already in the FS_list. This ensures that the STA is not polled before the requested start time. Furthermore, the AP 101 polls STAs from the FS_list at the corresponding start times and every time a STA in the position n is polled, the AP 101 updates its start time a follows:

$$X_n.\text{start\_time} = X_n.\text{start\_time} + X_n.SI. \quad (4)$$

Due to the proposed system and method and the fact that all PS STAs are assigned the same SI, the scheduling order does not change as the STAs are polled. The only difference from one beacon to another are new STAs that may be added at the end of the list.

In one embodiment, when a PS STA is inserted into the fixed scheduling list, the AP 101 (or other STA controlling the access to the channel) could define the TXOP_Duration granted to the STA as the amount of time need to allow the STA to transmit all data frames generated since the last TXOP plus all possible retransmissions allowed by the protocol for each data frame.

In another embodiment, the extra-time for retransmissions added to the TXOP, could be dependent on the channel conditions, which can be inferred through channel measurements. The better the channel conditions, the less extra-time would be granted per TXOP.

Figure 5:
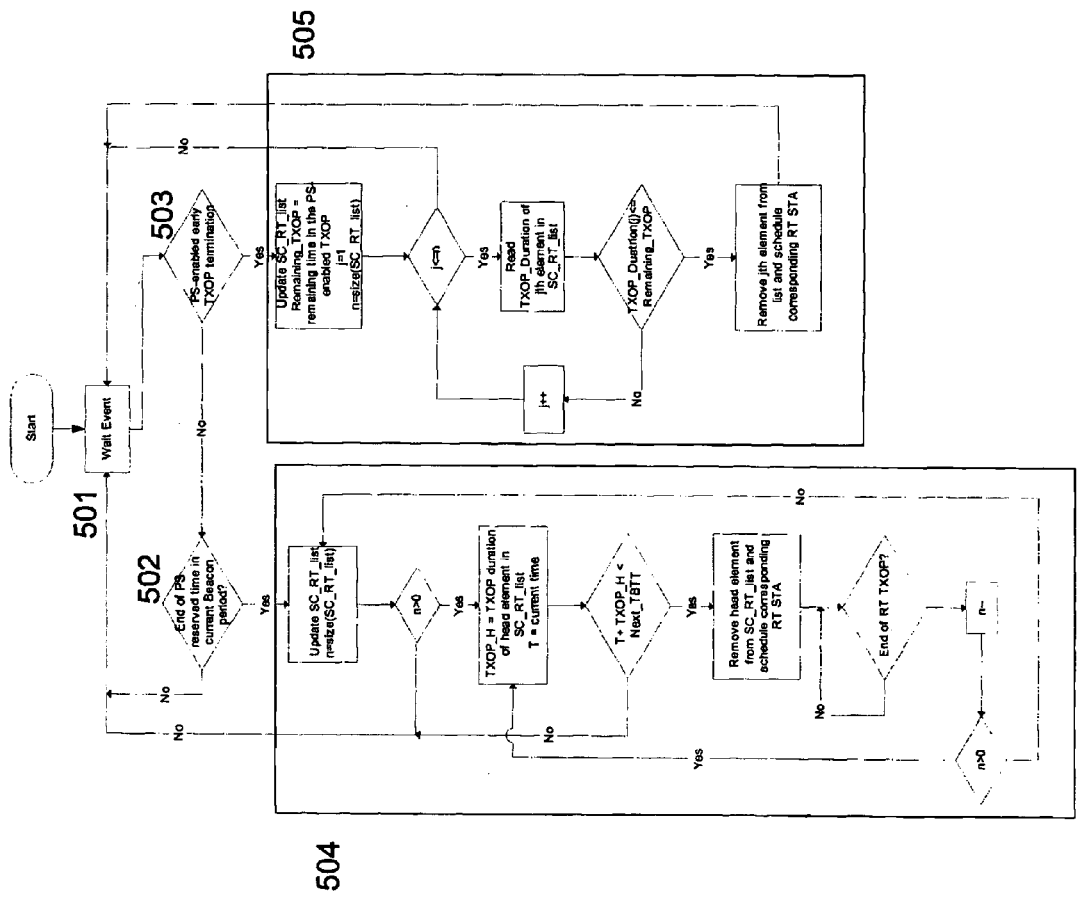
FIG. 5 is a flow chart of a method of wireless communication in accordance with a representative embodiment.

As noted previously, the opportunistic scheduling may be used to further utilize the medium access. FIG. 5 is a flow chart of a method 500 of wireless communication that provides for opportunistic scheduling. Notably, certain sub-steps are shown in FIG. 5. The details of these sub-steps are not described in detail to avoid obscuring the description of the present illustrative embodiments.

When a RT STA is admitted, a new entry is included in the RT_list. In one embodiment, each element Y in the RT_list would contain, at least, the following attributes:

Y.Address: MAC address of the STA;
Y.mSI: minimum time interval between two consecutive service periods;
Y.MSI: maximum time interval between two consecutive service periods;
Y.DB: maximum delay supported by STA
Y.TXOP_Duration: amount of time to granted to the STA in the next service period.
Y.last_TXOP_time: the time of the last TXOP was granted to this STA.

At step 501 the method waits for one of the both events, namely: a PS TXOP is terminated early or the end of a PS period. At step 503 of the method determines if the PS STA has terminated transmission before the termination of a PS TXOP. This would occur for example, if an ACK is transmitted by the AP and the polled STA has no more data to transmit within the allocated PX TXOP. If so, at step 505 the AP (i.e., the scheduler) checks a second list, SC_RT_list, which contains one entry for each STA that is eligible, at a given time instant, to receive a TXOP from the AP, to decide which STA to grant the a TXOP using the remaining time in the terminated PS TXOP. The SC_RT_list is updated as the first task in step 505. In an embodiment, the SC_RT_list is updated at a given time instant T by the AP 101 searching the RT_list for elements that satisfy the following condition:

$$Y.mSI \leq T - Y.\text{last\_TXOP\_time} \leq Y.MSI. \quad (5)$$

In one embodiment each element in the SC_RT_list would be a copy of the element in the RT_list with one additional attribute to define the deadline for the corresponding STA, which would be defined as $$Y.D=Y.\text{last\_TXOP\_time}+Y.DB. \quad (6)$$

Furthermore, the SC_RT_list is ordered by the early dead line first policy. In the rest of step 505 the AP 101 selects the STA from the SC_RT_list to be granted the remaining TXOP time.

At step 502 the method checks if the PS period has ended. This provides an opportunity for non-PS STAs to be granted access to the channel. If this is the case, at step 504 the AP 101 updates the SC_RT_list according the earliest deadline as described previously. If the STA at the beginning/top of the list is eligible to receive a TXOP in the current beacon interval, the AP 101 removes the STA from the SC_RT_list, schedule a TXOP to the STA and repeats the same process for other STAs in the SC_RT_list.

In one embodiment, the opportunistic scheduling algorithm of FIG. 5 could be used by the AP 101 to grant TXOPs to RT STAs. As can be noted, the RT STAs are scheduled in two different situations: 1) after all PS-enabled STAs have been scheduled in a beacon period (and the method continues at step 504); or 2) when a PS-STA does not use its complete TXOP and the remaining time is enough to allocate a RT TXOP (and the method continues at 505). Another important feature in the algorithm is that RT STAs are scheduled according to their deadlines.

In the representative embodiments described herein, a wireless method and system provide priority access to STAs having PS requirements. As will be appreciated by one of ordinary skill in the art, many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. A wireless system, comprising:
a plurality of wireless stations (STA), wherein at least one of the STAs is a power save (PS) STA; and
another wireless STA adapted to control access to a medium of a wireless network, wherein the at least one PS STA is provided deterministic access to the medium before other STAs of the plurality of STAs;
wherein the another wireless STA is an access point (AP) and the wireless network is a centralized wireless network;
wherein the AP transmits a beacon to the STAs at the beginning of a superframe or a beacon interval;
wherein a power-save (PS) communication period succeeds a beacon transmission period (BT) and precedes other communication periods;
wherein a power save transmission opportunity (PS-TXOP) is granted to each of the at least one PS STAs at a respective deterministic start time and consecutive PS-TXOPs are granted to the same PS STA at deterministic start times in consecutive PS periods.

2. The wireless system as claimed in claim 1, wherein the deterministic access is provided by assigning a PS-TXOP to each of the at least one PS STA in the PS communication period.

3. The wireless system as claimed in claim 1, wherein the at least one PS STA is at least one of a medical telemetry device and a medical monitoring device.

4. The wireless system as claimed in claim 1, wherein each of the at least one PS STAs enters a sleep mode after it completes its access to the medium.

5. The wireless system as claimed in claim 1, wherein in response to a PS STA completing its access to the medium prior to termination of the PS-TXOP, the AP allocates a remaining portion of the PS-TXOP to a non-PS STA.

6. The wireless system as claimed in claim 1, wherein the PS communication period includes consecutive PS-TXOPs.

7. The wireless system as claimed in claim 6, wherein the consecutive PS-TXOPs satisfy $$x_{n+1}\text{start time}>x_n\text{start time}+x_n TXOP \text{ duration}$$

wherein $x_n$ and $x_{n+1}$ are the consecutive PS-TXOPs.

8. The wireless system as claimed in claim 1, wherein the AP assigns service intervals for all of the PS STAs as a multiple of the beacon interval.

9. The wireless system as claimed in claim 1, wherein the AP generates a PS STA fixed scheduling list and a non-PS STAs list.

10. The wireless system as claimed in claim 9, wherein the PS STA fixed scheduling list includes at least the deterministic start time and PS-TXOP duration for each PS STA and the non-PS STA list includes at least the TXOP duration for each non-PS STA.

11. A method of wireless communication, the method comprising:
classifying at least one power save (PS) wireless station (STA) and at least one non-PS STA from a plurality of STAs;
transmitting a beacon to the plurality of STAs at the beginning of a superframe or a beacon interval from an access point (AP), wherein the AP is one of the plurality of STAs;
providing deterministic access to a medium of a wireless network in a PS communication period for the at least one PS STA before the at least one non-PS STA, wherein the PS communication period succeeds a beacon transmission (BT) period and precedes all other communication periods;
scheduling a power save transmission opportunity (PS-TXOP) to each of the at least one PS-STAs at a respective deterministic start time in the PS communication period after a termination of the BT period and before other transmission opportunities (TXOPs), wherein the consecutive PS-TXOPs are scheduled for the same PS STA at deterministic starts in the consecutive PS periods.

12. The method as claimed in claim 11, further including:
accessing the medium during an assigned PS-TXOP, wherein, after completing access to the medium, the PS STA enters a sleep mode.

13. The method as claimed in claim 11, further including:
accessing the medium during an assigned PS-TXOP, wherein, after completing access to the medium, but before an end of the PS-TXOP, allocating a remaining portion of the PS-TXOP to another STA.

14. The method as claimed in claim 13, wherein one STA is an access point (AP) and the another STA is a non-PS STA.

15. The method as claimed in claim 11, further including:
scheduling consecutive PS-TXOPs for a PS STA at deterministic start times.

16. The method as claimed in claim 15, wherein the consecutive PS-TXOPs are granted to the same PS STA at deterministic start times in consecutive PS communication periods.

17. The method as claimed in claim 11, further including:
accessing the medium from an access point (AP) or other STA within the PS-TXOP, and after completing access to the medium, receiving an acknowledgement (ACK) from the PS STA, the AP or other STA allocates a remaining portion of the PS-TXOP to another STA.

18. The method as claimed in claim 11, wherein the consecutive PS-TXOPs satisfy $$x_{n+1} \text{start time} > x_n \text{start time} + x_n TXOP \text{ duration}$$

wherein $x_n$ and $x_{n+1}$ are the consecutive PS-TXOPs.

19. The method as claimed in claim 11, further including:
generating a PS STA fixed scheduling list and a non-PS STAs list.

20. The method as claimed in claim 19, wherein the PS STA fixed scheduling list includes at least the deterministic start time and PS-TXOP duration for each PS STA and the non-PS STA list includes at least the TXOP duration for each non-PS STA.

* * * * *